(12) United States Patent
Kumbhare et al.

(10) Patent No.: US 11,151,713 B2
(45) Date of Patent: Oct. 19, 2021

(54) METHOD AND SYSTEM FOR DETECTION OF ANOMALIES IN SURFACES

(71) Applicants: Wipro Limited, Bangalore (IN); District of Columbia Water and Sewer Authority, Washington, DC (US)

(72) Inventors: Rupesh Wasudevrao Kumbhare, Bangalore (IN); Deepak Dinkar, Bangalore (IN); Saravanan Solaiyappan, Chennai (IN); Douglas Adams, E Logan, UT (US); Thomas L. Kuczynski, Fulton, MD (US); Hari Kurup, Falls Church, VA (US); Nichol Sowell, Upper Marlboro, MD (US); Chad Rogers, Alexandria, VA (US); LaShema M. Burrell, Temple Hills, MD (US)

(73) Assignees: Wipro Limited, Bangalore (IN); District of Columbia Water & Sewer Authority, Washington, DC (US)

(*) Notice: Subject to any disclaimer, the term of this patent is extended or adjusted under 35 U.S.C. 154(b) by 174 days.

(21) Appl. No.: 16/574,878

(22) Filed: Sep. 18, 2019

(65) Prior Publication Data

US 2021/0082098 A1 Mar. 18, 2021

(51) Int. Cl.
*G06K 9/00* (2006.01)
*G06T 7/00* (2017.01)
(Continued)

(52) U.S. Cl.
CPC .............. *G06T 7/001* (2013.01); *G06F 16/55* (2019.01); *G06N 3/04* (2013.01); *G06N 3/08* (2013.01);
(Continued)

(58) Field of Classification Search
CPC .................... G06T 7/001; G06T 7/269; G06T 2207/10016; G06T 2207/20081;
(Continued)

(56) References Cited

U.S. PATENT DOCUMENTS 10,937,144 B2\* 3/2021 Starr ..................... G06K 9/6267
2014/0313321 A1\* 10/2014 Olsson ................... H04N 7/181
348/135

(Continued)

OTHER PUBLICATIONS

Guo, W,, et at, "Automated detect detection for sewer pipeline inspection and condition assessment", Automation in Construction 18 (2009), pp. 587-596.\*

(Continued)

*Primary Examiner* — Samir A Ahmed
(74) *Attorney, Agent, or Firm* — Finnegan, Henderson, Farabow, Garrett & Dunner, LLP (57) ABSTRACT

A method and a system are described for detection of anomalies in surfaces, such as pipes. The method includes receiving an input comprising surface material type and plurality of frames of a real-time video stream associated with the surface. The method includes eliminating unwanted frames based on magnitude of 2-Dimensional optical flow vectors of the plurality of frames. The method includes identifying potential anomaly frames based on contours in a dense map created using a magnitude of displacement of each pixel of a frame. The method includes detecting in real-time anomalies in anomaly frames from potential anomaly frames based on trained models selected from a Model Mapping Table. The method includes classifying anomalies in the anomaly frames into anomaly classes using one or more deep learning techniques. The method includes generating a health report comprising anomalies in anomaly frames associated with the surface and providing health report to a user.

20 Claims, 5 Drawing Sheets

(51) Int. Cl.
G06T 7/269 (2017.01)
G06F 16/55 (2019.01)
G06N 3/08 (2006.01)
G06N 3/04 (2006.01)

(52) U.S. Cl.
CPC .... *G06T 7/269* (2017.01); *G06T 2207/10016* (2013.01); *G06T 2207/20081* (2013.01); *G06T 2207/30108* (2013.01)

(58) Field of Classification Search
CPC ......... G06T 2207/30108; G06T 7/0004; G06T 2207/20084; G06F 16/55; G06N 3/08; G06N 3/04
See application file for complete search history.

(56) References Cited

U.S. PATENT DOCUMENTS

| | | | | |
|---|---|---|---|---|
| 2015/0204652 | A1* | 7/2015 | Olsson | G01S 3/786 356/72 |
| 2017/0323163 | A1 | 11/2017 | Leung | |
| 2019/0139215 | A1* | 5/2019 | Starr | G06K 9/6271 |
| 2019/0333214 | A1* | 10/2019 | Haneda | G06K 9/00496 |

OTHER PUBLICATIONS

Hawari< A et al., "Automated defect detection tool for closed circuit television (cctv) inspected sewer pipelines", Automation in Construction 80 (2018), pp. 99-109.*
Moradi, S et al., Review on Computer Aided Sewer Pipeline Defect Detection and Condition Assessment, Infrastructure, 2019, 4, 10, pp. 1-15.*
Cheng, J.C.P., et al., "Automated detection of sewer pipe defects in closed-circuit television images using deep learning techniques", ScienceDirect, vol. 95, Nov. 2018, pp. 155-171. Abstract (3 pages).
Guo, W., et al., "Automation detect detection for sewer pipeline inspection and condition assessment", ScienceDirect, vol. 18, Issue 5, Aug. 2009, pp. 587-596. Abstract (2 pages).
Hawari, A., et al., "Automated defect detection tool for closed circuit television (cctv) inspected sewer pipelines", ScienceDirect, vol. 89, May 2018, pp. 99-109. Abstract (3 pages).

* cited by examiner

FIG. 5 Example Computer System

METHOD AND SYSTEM FOR DETECTION OF ANOMALIES IN SURFACES

TECHNICAL FIELD

The present subject matter is related, in general to anomaly detection systems, and more particularly, but not exclusively to a method and a system for detection of anomalies in surfaces.

BACKGROUND

Traditionally, inspection and maintenance of defects found in one or one surfaces such as water pipes or in sewers was being performed manually. A sewer and a water utility typically has miles of pipes in the pipe system. In order to perform maintenance on the pipes, the utility must periodically inspect the pipes. With the advent of technology, one common way of performing such an inspection is to send a remote controlled rover through the pipe to perform a video scan of the pipe system. While the video is being captured an operator identifies and tags observed defects marking the anomalies on the video frame and adding annotations of the anomaly details (e.g. location, position of anomaly, anomaly type, etc.) using a tool. Additional following scoring is then completed in the office by a certified technician using an industry approved standard such as NASSCO or WRc.

Depending on the size of the pipe system managed by the utility or other organization, the video scan process could generate several thousand hours of video annually. All of that video must be reviewed manually by one or more technicians, which takes several thousand hours to complete. This manual video review is not only time consuming, but is cumbersome and prone to errors. For example, the manual video review process requires focused attention from the operator since the scanning is done in real-time on an active street. Moreover, the manual review is prone to inconsistencies due to multiple reviewers, variability of judgment and human error. Follow-up in office reviews by certified engineers focus only on what the initial inspection detected and often fail to detect missed anomalies.

A pipe condition assessment report may be created manually by summarizing the details of anomalies found for the inspected section of the pipes in the pipe system. A reviewer then reviews the pipe condition assessment report along with the annotated video in order to verify correctness of the report and rectifies as necessary based on the actual feedback from the field. The repair crews would schedule maintenance activities based on the reviewed health report. Such a manual process is time and effort intensive and prone to human error. Each additional step adds time and effort and is subject to human error and/or operator bias.

Some of the existing solutions have tried to automate the anomaly detection and classification based on deep learning and image processing techniques. However, such solutions do not work for real time video stream input. Additionally, most of the existing solutions integrate with the scanning process and provide operator assisted detection and classification but still require operator confirmation. Further, such solutions do not have multiple models specific to pipe material type inspection for accuracy and do not adapt by itself for changing conditions of the pipe surfaces and new pipe types by continuous learning through selective re-training of models based on the cumulative feedback. Further, the existing deep learning solutions do not have the capability of auto-re-training the models for adopting to different surface conditions for the same pipe material or the same surface material. The existing solutions fail to provide continuous learning capability to detect anomalies and changes of patterns in the pipe surfaces over the period.

Thus, there is a need for faster and accurate detection of anomalies in surfaces, such as pipes in an automated manner. Further, there is a need for improving the deep learning techniques for catering to variation in pipe material types and pipe surface conditions over the period. In a real-life surface assessment scenario, such as pipeline condition assessment scenario, there is a need for anomaly detection that is suitable for different types of pipe materials collected from a variety of source inspection devices. Such a mechanism should also be able to work for surfaces or pipes made of same material but with different surface conditions, for example, the surface condition of a pipe changes over time due to aging, depositions, and the like.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for detection of anomalies in one or more surfaces. The method may include receiving an input comprising a surface material type and a plurality of frames of a real-time video stream associated with the one or more surfaces. The method may include eliminating one or more unwanted frames from the plurality of frames based on a magnitude of 2-Dimensional optical flow vectors of each of the plurality of frames. The method may include identifying one or more potential anomaly frames from the plurality of frames based on contours in a dense map created using a magnitude of displacement of each pixel of a frame from the plurality of frames. In an embodiment, the magnitude of displacement of the pixel is determined based on the optical flow vectors associated with each frame. In an embodiment, based on the size and location of the contours in a frame, the frame is identified as a potential anomaly frame. The method may include detecting in real-time one or more anomalies in the one or more anomaly frames from the one or more potential anomaly frames based on one or more trained models selected from a Model Mapping Table. In an embodiment, each of the one or more trained models is associated with one or more surface material types of the one or more surfaces. In an embodiment, each of the one or more trained models are trained using one or more deep learning techniques. The method may include classifying the detected one or more anomalies in the one or more anomaly frames into at least one of a plurality of anomaly classes using the one or more deep learning techniques. The method may include generating a health report comprising one or more anomalies in the one or more anomaly frames associated with the one or more surfaces and providing the health report to a user.

According to embodiments illustrated herein, there may be provided an anomaly detection server to detect anomalies in one or more surfaces. The anomaly detection server may comprise a processor and a memory communicatively coupled to the processor. The memory stores processor instructions, which, on execution, causes the processor to receive an input comprising a surface material type and a plurality of frames of a real-time video stream associated with the one or more surfaces. The processor may be further configured to eliminate one or more unwanted frames from the plurality of frames based on a magnitude of 2-Dimensional optical flow vectors of each of the plurality of frames. The processor may be further configured to identify one or more potential anomaly frames from the plurality of frames based on contours in a dense map created using a magnitude of displacement of each pixel of a frame from the plurality of frames. In an embodiment, the magnitude of displacement of the pixel is determined based on the optical flow vectors associated with each frame. In an embodiment, based on the size and location of the contours in a frame, the frame is identified as a potential anomaly frame. The processor may be further configured to detect in real-time one or more anomaly frames from the one or more potential anomaly frames based on one or more trained models selected from a Model Mapping Table. In an embodiment, each of the one or more trained models is associated with one or more surface material types of the one or more surfaces. In an embodiment, each of the one or more trained models are trained using one or more deep learning techniques. The processor may be further configured to classify the detected one or more anomalies in the one or more anomaly frames into at least one of a plurality of anomaly classes using the one or more deep learning techniques. The processor may be further configured to generate a health report comprising one or more anomalies in the one or more anomaly frames associated with the one or more surfaces and providing the health report to a user.

According to embodiments illustrated herein, a non-transitory computer-readable storage medium having stored thereon, a set of computer-executable instructions for causing a computer comprising one or more processors to perform steps of receiving an input comprising a surface material type and a plurality of frames of a real-time video stream associated with the one or more surfaces. The one or more processors may be configured to eliminate one or more unwanted frames from the plurality of frames based on a magnitude of 2-Dimensional optical flow vectors of each of the plurality of frames. The one or more processors may be configured to identify one or more potential anomaly frames from the plurality of frames based on contours in a dense map created using a magnitude of displacement of each pixel of a frame from the plurality of frames, wherein the magnitude of displacement of the pixel is determined based on the optical flow vectors associated with each frame, wherein based on the size and location of the contours in a frame, the frame is identified as a potential anomaly frame. The one or more processors may be configured to detect in real-time one or more anomalies in the one or more anomaly frames from the one or more potential anomaly frames based on one or more trained models selected from a Model Mapping Table, wherein each of the one or more trained models is associated with one or more surface material types of the one or more surfaces, wherein each of the one or more trained models are trained using one or more deep learning techniques. The one or more processors may be configured to classify the detected one or more anomalies in the one or more anomaly frames into at least one of a plurality of anomaly classes using the one or more deep learning techniques. The one or more processors may be configured to generate a health report comprising one or more anomalies in the one or more anomaly frames associated with the one or more surfaces and providing the health report to a user.

BRIEF DESCRIPTION OF THE ACCOMPANYING DRAWINGS

The accompanying drawings, which are incorporated in and constitute a part of this disclosure, illustrate exemplary, embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes, which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.
Definitions Surfaces: The term surface herein refers to a flat surface, a curved surface or a boundary of any three-dimensional solid structure. In an embodiment, the flat surface may be defined using a two-dimensional collection of points. In an embodiment, the curved surface may be defined using a three-dimensional collection of points. In general, a surface is a continuous boundary dividing a three-dimensional space into two regions. For example, the surface of a sphere separates the interior from the exterior; a horizontal plane separates the half-plane above it from the half-plane below. For the purpose of implementation, surfaces mentioned herein may be referred to as surfaces of a pipeline or a conduit. The interior as well as exterior surfaces of the pipeline may be investigated to detect anomalies in the pipeline.

Deep learning model: Deep learning is a machine learning method based on artificial neural networks. An example of the neural network model is the Alexnet model. In deep learning, a computer model learns to perform classification tasks directly from images, text, or sound. Deep learning models can achieve state-of-the-art accuracy, sometimes exceeding human-level performance. Deep learning models are trained by using a large set of labeled data and neural network architectures that contain many layers. The deep learning model 222 mentioned herein comprises of multiple hidden neural network layers, which are trained by using large sets of labeled data, and neural network architectures that learn to detect one or more anomalies in the anomaly frames from potential anomaly frames. The deep learning model 222 mentioned herein further is configured to classify the detected one or more anomalies in the anomaly frames into at least one anomaly class. In an embodiment, the deep learning model 222 may be trained using an object detection technique, such as Faster R-CNN technique.

Optical flow vector: Optical flow or optic flow is the pattern of apparent motion of objects, surfaces, and edges in two consecutive frames caused by the relative motion between an observer and a scene. Optical flow can also be defined as the distribution of apparent velocities of movement of brightness pattern in an image. A 2-Dimensional optical flow vector illustrates a displacement vector showing the movement of points from a first frame to a second frame.

Frame: The term frame mentioned herein refers to one of many still images, which compose a complete moving video.

Potential anomaly frame: The term potential anomaly frame mentioned herein refers to a set of frames from the plurality of frames that may possibly contain anomalies associated with the surface.

Anomaly frame: The term anomaly frame mentioned herein refers to set of frames from the set of potential anomaly frames that contain anomalies associated with the surface.

The disclosed method and system provides an effective detection of anomalies in one or more surfaces, such as a pipeline, water-pipeline using a deep learning model 222. The disclosed method and system has the ability for fast and accurate anomaly detection for pipes with various materials and surface conditions. The anomaly detection is based on minimal and sufficient number of relevant video frames from an incoming video-stream for fast and accurate detection. The minimal and sufficient number of relevant video frames are obtained by removing unwanted frames. Examples of unwanted frames may include idle frames, jitter and the like. Further, the number of relevant frames are narrowed down to determine potential anomaly frames. Only such potential anomaly frames are fed as input to the deep learning model 222 to detect the anomalies and further classify the anomalies. The disclosed method and system utilizes one or more trained models associated with one or more surface material types of the one or more surfaces to cater to various pipe material and surface conditions for detection of the anomalies. Further, the disclosed method and system performs selective re-training of deep-learning models based on cumulative user feedback and accumulated training data. In an embodiment, the disclosed method and system may be performed in real-time to detect and classify the anomalies. In an alternate embodiment, the disclosed method and system may be performed in an offline mode to detect and classify the anomalies. In an offline mode, the anomalies may not be detected and classified on a real-time video stream. The anomalies may be detected and classified on a pre-stored video stream.

Figure 1:
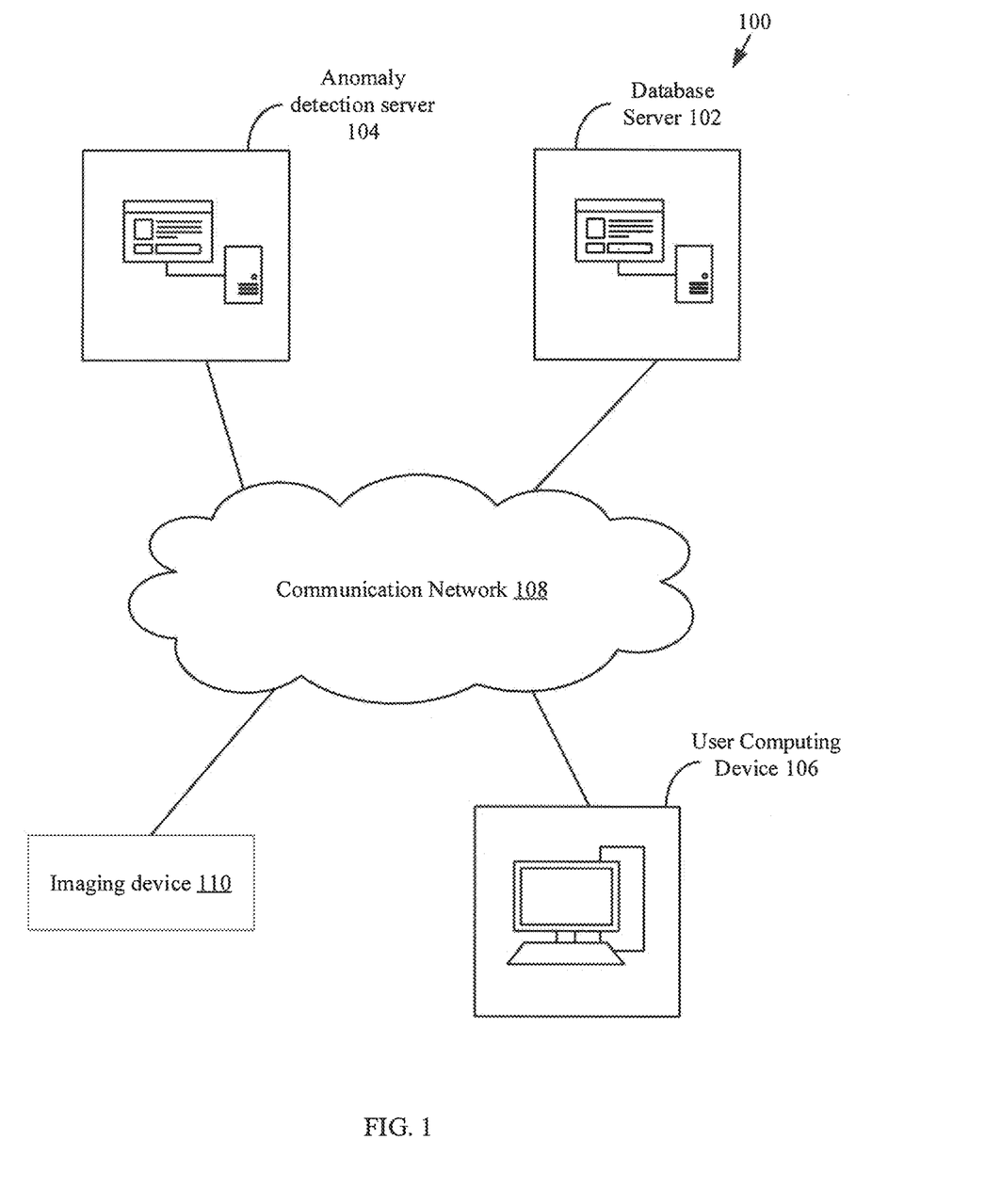
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a database server 102, an anomaly detection server 104, a user-computing device 106, a communication network 108, and an imaging device 110. The anomaly detection server 104 may be communicatively coupled to the database server 102, the user-computing device 106, and the imaging device 110 via the communication network 108. In an embodiment, the anomaly detection server 104 may communicate with the database server 102 using one or more protocols such as, but not limited to, Open Database Connectivity (ODBC) protocol and Java Database Connectivity (JDBC) protocol. In an embodiment, the user-computing device 106 may communicate with the anomaly detection server 104, via the communication network 106. In an embodiment, the imaging device 110 may communicate with the anomaly detection server 104, via the communication network 106.

In an embodiment, the database server 102 may refer to a computing device that may be configured to store a Model Mapping Table. The Model Mapping Table may comprise one or more trained models associated with one or more surface material types of the one or more surfaces. The Model Mapping Table may further comprise one or more versions of each of the trained models associated with each of the one or more surface material types, and information related to history of accuracy for each of the one or more versions of each of the trained models. For the sake of implementation, the Model Mapping Table may comprise one or more trained models associated with one or more surface material types of the water-pipeline. For example, the Model Mapping Table may comprise two version of the trained models for copper water-pipeline. Similarly, the Model Mapping Table may comprise three versions of the trained models for iron water-pipeline. In an embodiment, the database server 102 may further store the generated health reports for later reuse. In an embodiment, the database server 102 may further store the detected one or more anomalies in the one or more anomaly frames along with the associated classification and the user feedback in a database. The database may be used for subsequent training of the one or more trained models at a scheduled timing.

In an embodiment, the database server 102 may further store configurations and parameters required for the training of the deep learning model 222, configurations required for implementing the system, training datasets and deep learning model weights. In an embodiment, the database server 102 may further hold a placeholder for the training dataset for each surface material type. In an embodiment, the database server 102 may further store the scheduled re-training configurations as well. In an embodiment, the database server 102 may further store history of accuracy for each model versions of each of the trained one or more models.

In an embodiment, the database server 102 may include a special purpose operating system specifically configured to perform one or more database operations on the plurality of frames of the real-time video stream. Examples of database operations may include, but are not limited to, Select, Insert, Update, and Delete. In an embodiment, the database server 102 may include hardware and/or software that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

A person with ordinary skills in the art will understand that the scope of the disclosure is not limited to the database server 102 as a separate entity. In an embodiment, the functionalities of the database server 102 can be integrated into the anomaly detection server 104, and vice versa.

In an embodiment, the anomaly detection server 104 may refer to a computing device or a software framework hosting an application or a software service. In an embodiment, the anomaly detection server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The anomaly detection server 104 may be realized through various types of application servers such as, but are not limited to, a Java application server, a .NET framework application server, a Base4 application server, a PHP framework application server, or any other application server framework.

In an embodiment, the anomaly detection server 104 may be configured to receive an input, from the user-computing device 106, comprising a surface material type and a plurality of frames of a real-time video stream associated with the one or more surfaces. The anomaly detection server 104 may be configured to eliminate one or more unwanted frames from the plurality of frames based on a magnitude of 2-Dimensional optical flow vectors of each of the plurality of frames. The anomaly detection server 104 may be configured to identify one or more potential anomaly frames from the plurality of frames based on contours in a dense map created using a magnitude of displacement of each pixel of a frame from the plurality of frames. In an embodiment, the magnitude of displacement of the pixel is determined based on the optical flow vectors associated with each frame. In an embodiment, based on the size and location of the contours in a frame, the frame is identified as a potential anomaly frame.

The anomaly detection server 104 may be configured to detect in real-time one or more anomalies in the one or more anomaly frames from the one or more potential anomaly frames based on one or more trained models selected from a Model Mapping Table. In an embodiment, each of the one or more trained models is associated with one or more surface material types of the one or more surfaces. In an embodiment, each of the one or more trained models are trained using one or more deep learning techniques. The anomaly detection server 104 may be configured to classify the detected one or more anomalies in the one or more anomaly frames into at least one of a plurality of anomaly classes using the one or more deep learning techniques. The anomaly detection server 104 may be configured to generate a health report comprising one or more anomalies in the one or more anomaly frames associated with the one or more surfaces and providing the health report to a user.

The anomaly detection server 104 may be configured to receive, from the user-computing device 106, feedback from a user. The anomaly detection server 104 may be configured to dynamically retrain the one or more trained models based on the received feedback to adapt the one or more trained models for detection of anomalies in the one or more surfaces with at least one of one or more new surface material type or different/changing surface conditions/patterns due to aging of the one or more surfaces over a period of time. The anomaly detection server 104 may be configured to add at least one bounding box in one or more portions of the detected one or more anomaly frames. The anomaly detection server 104 may be configured to add metadata comprising at least one of anomaly details, confidence score, anomaly label and distance information to the one or more anomaly frames. The anomaly detection server 104 may be configured to prepare an edge map based on edge detection by identifying grayscale intensity change in the plurality of frames. The anomaly detection server 104 may be configured to transmit, to the database server 102, the detected one or more anomaly frames along with the associated classification and the user feedback. The operation of the anomaly detection server 104 has been discussed later in conjunction with FIG. 2.

In an embodiment, the user-computing device 106 may refer to a computing device used by a user. The user-computing device 106 may be comprised of one or more processors and one or more memories. The one or more memories may include computer readable code that may be executable by the one or more processors to perform predetermined operations. In an embodiment, the user-computing device 106 may transmit the input received from the user, to the anomaly detection server 104, comprising the surface material type and the plurality of frames of the real-time video stream associated with the one or more surfaces. Further, the user-computing device 106 may be configured to transmit, to the anomaly detection server 104, feedback associated with the health report received from the user.

Further, the user-computing device 106 may be configured to present a user-interface to the user to provide the user input. Further, the user-computing device 106 may be configured to receive the generated health report from the anomaly detection server 104. Further, the user-computing device 106 may be configured to display the health report to the user. Examples of the user-computing device 106 may include, but are not limited to, a personal computer, a laptop, a personal digital assistant (PDA), a mobile device, a tablet, or any other computing device.

A person having ordinary skill in the art will appreciate that the scope of the disclosure is not limited to realizing the anomaly detection server 104 and the user-computing device 106 as separate entities. In an embodiment, the anomaly detection server 104 may be realized as an application program installed on and/or running on the user-computing device 106 without departing from the scope of the disclosure.

In an embodiment, the communication network 108 may correspond to a communication medium through which the database server 102, the anomaly detection server 104, the user-computing device 106 and the imaging device 110 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the imaging device 110 may refer to an image capturing device, such as a camera that may be configured to capture the real-time video stream associated with the one or more surfaces. In an implementation, the imaging device 110 may be mounted on a remotely controlled rover to maneuver and capture the real-time video Stream. For the sake of implementation, the imaging device 110 may be a camera that captures the real-time video stream of a water/wastewater pipeline. In an alternate embodiment, the pipeline may also be a natural gas pipeline or any other pipeline via which at least one of liquid or gas is transported.

Figure 2:
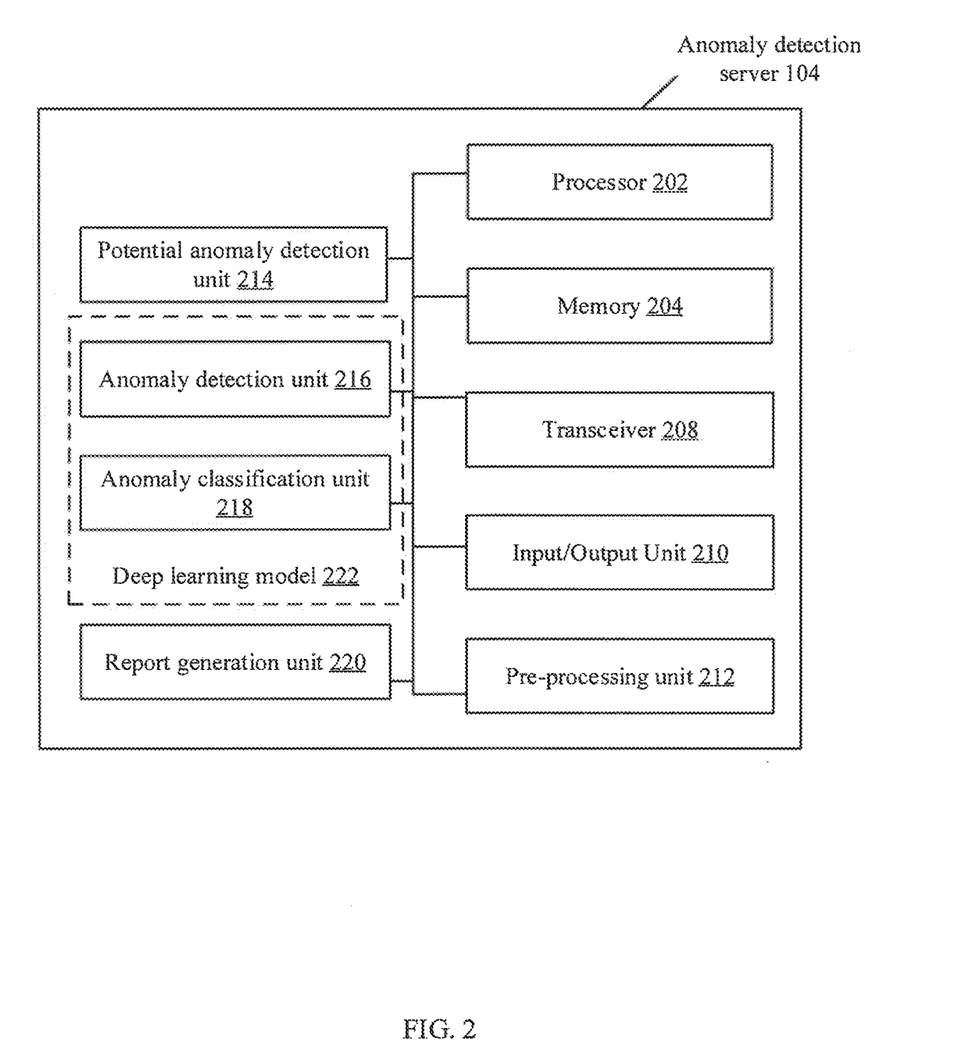
FIG. 2 is a block diagram that illustrates an anomaly detection server configured to perform detection of anomalies in one or more surfaces, in accordance with some embodiments of the present disclosure.

FIG. 2 is a block diagram that illustrates an anomaly detection server configured to perform detection of anomalies in one or more surfaces, in accordance with some embodiments of the present disclosure.

The anomaly detection server 104 further comprises a processor 202, a memory 204, a transceiver 208, an input/output unit 210, a pre-processing unit 212, potential anomaly detection unit 214, an anomaly detection unit 216, an anomaly classification unit 218, and a report generation unit 220. The processor 202 may be communicatively coupled to the memory 204, the transceiver 208, the input/output unit 210, the pre-processing unit 212, the potential anomaly detection unit 214, the anomaly detection unit 216, the anomaly classification unit 218, and the report generation unit 220. The anomaly detection unit 216 and the anomaly classification unit 218 together in conjunction form the deep learning model.

The processor 202 comprises suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which may be executed by the processor 202. In an embodiment, the memory 204 may be configured to store one or more programs, routines, or script that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 208 comprises of suitable logic, circuitry, interfaces, and/or code that may be configured to receive an input, from the user-computing device 106, comprising a surface material type and a plurality of frames of a real-time video stream associated with the one or more surfaces. The transceiver 208 may be configured to retrieve the trained model associated with the received surface material type from the database server 102, via the communication network 108. The transceiver 208 may be further configured to transmit the detected anomalies and the associated classification to the database server 102. The transceiver 208 may be further configured to transmit the generated health report to the user-computing device 106 and the database server 102, via the communication network 108.

The transceiver 208 may implement one or more known technologies to support wired or wireless communication with the communication network. In an embodiment, the transceiver 208 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The Input/Output (I/O) unit 210 comprises suitable logic, circuitry, interfaces, and/or code that may be configured to receive an input or transmit an output. The input/output unit 210 comprises of various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

The pre-processing unit 212 comprises suitable logic, circuitry, interfaces, and/or code that may be configured to calculate the 2-Dimensional optical flow vectors of each of the plurality of frames. The pre-processing unit 212 may be further configured to eliminate one or more unwanted frames from the plurality of frames based on the magnitude of the 2-Dimensional optical flow vectors of each of the plurality of frames. The pre-processing unit 212 may be further configured to create a placeholder for a training dataset and adding configuration details of a base model for the one or more new surface material types in the Model Mapping Table if a trained model is not present in the Model Mapping Table for one or more new surface material types.

The potential anomaly detection unit 214 comprises suitable logic, circuitry, interfaces, and/or code that may be configured to create a dense map using a magnitude of displacement of each pixel of a frame from the plurality of frames. In an embodiment, the magnitude of displacement of the pixel is determined based on the optical flow vectors associated with each frame. The potential anomaly detection unit 214 may be further configured to identify one or more potential anomaly frames from the plurality of frames based on contours in the dense map. Additionally, based on the size and location of the contours in the frame, the frame is identified as a potential anomaly frame.

The anomaly detection unit 216 comprises suitable logic, circuitry, interfaces, and/or code that may be configured to detect in real-time one or more anomalies in the one or more anomaly frames from the one or more potential anomaly frames based on one or more trained models selected from a Model Mapping Table. The anomaly detection unit 216 may be further configured to add at least one bounding box in one or more portions of the detected one or more anomaly frames. The anomaly detection unit 216 may be further configured to add metadata comprising at least one of anomaly details, confidence score, anomaly label and distance information to the one or more anomaly frames. The anomaly detection unit 216 may be further configured to prepare an edge map based on edge detection by identifying grayscale intensity change in the plurality of frames. In an embodiment, the intensity change regions are identified by finding a gradient of the plurality of frames.

The anomaly classification unit 218 comprises suitable logic, circuitry, interfaces, and/or code that may be configured to classify the detected one or more anomalies in the one or more anomaly frames into at least one of a plurality of anomaly classes using the one or more deep learning techniques.

The report generation unit 220 comprises suitable logic, circuitry, interfaces, and/or code that may be configured to generate a health report comprising one or more anomalies in the one or more anomaly frames associated with the one or more surfaces and providing the health report to a user. The report generation unit 220 may further be configured to dynamically retraining the one or more trained models based on the received feedback to adapt the one or more trained models for detection of anomalies in the one or more surfaces with at least one of: one or more new surface material type or different/changing surface conditions/patterns due to aging of the one or more surfaces over a period of time.

In operation, at the beginning when the system is not configured and the system is not trained, then an initial configuration may be performed. Such an initial configuration also needs to be performed when a trained model is not available in the Model Mapping table and when re-training of the existing models is to be triggered. During initial configuration of the system, an authorized person uploads relevant deep-learning models and associated training data into the database server 102 to create the Model Mapping Table.

In an embodiment, when scheduled model re-training is to be performed then the pre-processing unit 212 may retrieve and load the scheduled model re-training configurations from the database server 102 into the memory 202 along with a training dataset. The pre-processing unit 212 may then load the configuration and weights of the previous model if exists for the re-training and initiate the model retraining. In an embodiment, the pre-processing unit 212 monitors the metrics of the training and stops the training when it reaches the configured loss value or configured number of iterations. The pre-processing unit 212 may then store the trained model in the Model Mapping Table. The pre-processing unit 212 may update the configuration to use the new model for the next assessment session.

In an embodiment, the pre-processing unit 212 may check existence of a deep learning model configuration. If no such deep learning model configuration or deep learning model is found in the Model Mapping Table then the pre-processing unit 212 may identify raw deep learning model details and associated training data from the database server 102. The pre-processing unit 212 may then train the raw deep learning model using the training data. The pre-processing unit 212 may store such trained one or more models associated with each surface material type in the database server for subsequent assessments.

Once training is completed for the selected surface material type, the pre-processing unit 212 creates a Model Mapping Table (MMT) and makes an entry with the trained model and the respective surface material type detail. In an embodiment, the pre-processing unit 212 may also store the version of the trained model for the selected surface material type. For each surface material type, the above mentioned steps are repeated to create a trained model associated with each surface material type.

After the initial configuration is done and the trained models are available in the Model Mapping Table, the transceiver 206 may receive an input comprising a surface material type and a plurality of frames of a real-time video stream associated with the one or more surfaces. In an embodiment, the one or more surfaces may comprise a conduit, a plain surface, or an irregular shaped surface. In an embodiment, the transceiver 206 may further receive the real-time video stream source details and the surface material type configurations. In an embodiment, the transceiver 206 may maintains a Frame Buffer Queue (FBQ) to receive the real time video stream and save as frames. The real-time video stream may be received in the standard format such as MPEG, MPEG-4, AVI, and the like. This may be a local or remote file interface, video streaming interface, and the like.

In response to the received surface material type, the pre-processing unit 212 may load the associated trained model for the received surface material type into the memory 202. The pre-processing unit 212 may then perform pre-processing operations on the plurality of frames. In an embodiment, the pre-processing operations may include grayscale conversion, noise reduction and the like. After the pre-processing operations are performed, the pre-processing unit 212 may calculate a magnitude of 2-Dimensional optical flow vectors of each of the plurality of frames using Gunner Farneback's technique. The pre-processing unit 212 may be configured to eliminate one or more unwanted frames from the plurality of frames based on the calculated magnitude of 2-Dimensional optical flow vectors of each of the plurality of frames. In order to eliminate the unwanted frames, the transceiver 206 receives the first and a subsequent key frame from real-time video stream. The pre-processing unit 212 may be configured to check if the input is an encoded video, then it extracts the I-Frame as the key frame from the video by parsing the frame header information. However, if the real-time video stream is a raw video stream then the key frame is identified by avoiding the idle frames. In an embodiment, the idle frames are identified based on the calculated magnitude of the 2-Dimensional optical flow vector.

If the received frame from the plurality of frames is identified as an idle frame then such as frame is skipped, however, if it is not identified as an idle frame then the frame is checked for jitter. In an embodiment, the pre-processing unit 212 may be configured to determine the frames that contain jitter by comparing relative angle/direction of the frame with respect to a set of previous frame(s) based on the respective 2-Dimensional optical flow vectors. If the received frame does not contain jitter then such as frame is a key frame. Thus, the pre-processing unit 212 identifies key frames from the plurality of frames by eliminating the unwanted frames i.e. the idle frames and frames that contain jitter.

In order to find out potential major anomalies in the plurality of frames, after the key frames are identified, the potential anomaly detection unit 214 may be configured to create a dense map using a magnitude of displacement of each pixel of a frame from the plurality of frames. In an embodiment, the magnitude of displacement of the pixel is determined based on the 2-Dimensional optical flow vectors associated with each frame. In an embodiment, the magnitude of displacement is converted to a single channel image, which corresponds to the dense map. The created dense map is utilized by the potential anomaly detection unit 214 to identify one or more potential anomaly frames from the key frames in the plurality of frames based on contours present in the dense map. In order to find the boundaries of the dense regions using contours, the dense map is converted to a binary image with a threshold and the very small disconnected areas in the dense map are removed by morphological open operation. In an embodiment, based on the size and location of the contours in a frame of the dense map, the frame is identified as a potential anomaly frame. Examples of such potential anomalies could be material depositions, root-intrusions, damages to the surface material such as pipes. The anomalies identified by using the contours of the dense map are mostly 3D anomalies.

In an embodiment, if the key frame is not identified as a potential anomaly frame then the key frame does not have any potential major anomalies. In order to find out whether the key frame has potential minor anomalies, the potential anomaly detection unit 214 may be further configured to identify grayscale intensity change in the plurality of frames. In an embodiment, the intensity change regions are identified by finding a gradient of the plurality of frames. After the grayscale intensity change is determined then the potential anomaly detection unit 214 may be further configured to prepare an edge map based on one or more edge detection techniques, such as Canny edge detection technique. In an embodiment, based on the size and location of the contours in a frame of the edge map, the frame is identified as a potential anomaly frame. Examples of the anomalies found include presence of crack signatures in the frame. The anomalies identified by using the contours of the edge map are mostly 2-Dimensional anomalies.

If the frame is not selected as a potential anomaly frame based on the dense map and edge map then potential anomaly detection unit 214 may be configured to repeat the above steps for the subsequent frame. Only those frames that are identified as potential anomaly frames are given as input to the deep learning model 222 for detecting the anomalies and classifying them further. As can be noted from the above, all the plurality of frames are not fed to the deep learning model 222 which leads to fast and accurate result/report generation. The disclosed method ensures that all the unwanted frames are eliminated and not fed to the deep learning model 222 and thus, by doing so the number of frames/images to be inferenced by the deep learning model 222 will be reduced to a great extent.

After the potential anomaly frame is identified, the anomaly detection unit 216 may be configured to detect in real-time one or more anomalies in the one or more anomaly frames from the one or more potential anomaly frames based on one or more trained models selected from the Model Mapping Table. In an embodiment, each of the one or more trained models is associated with one or more surface material types of the one or more surfaces. In an embodiment, each of the one or more trained models are trained using one or more deep learning techniques. In an embodiment, the Model Mapping Table comprises one or more versions of each of the trained models associated with each of the one or more surface material types, and information related to history of accuracy for each of the one or more versions of each of the trained models. In an embodiment, as discussed earlier, if a trained model is not present in the Model Mapping Table for one or more new surface material types then a placeholder is created for a training dataset and adding configuration details of a base model for the one or more new surface material types in the Model Mapping Table. The base model will be improved by re-training with the upcoming training datasets in an automatic manner. In an embodiment, the one or more trained models have been trained to detect non-defect items comprising cobwebs, water surfaces, wall surface patterns, water flow marks on the surfaces and further eliminate the non-defect items from the health report.

The anomaly detection unit 216 may be configured to initialize the inspection session of the system by loading the trained model associated with the surface material type from the memory 202. The trained model in the memory has been cached by retrieved the associated trained model from the model mapping table stored in the database server 102. The anomaly detection unit 216 may be further configured to load the system configuration parameters as well. In response to loading of the trained model associated with the surface material type and the configuration parameters, the potential anomaly frames are provided as input to the anomaly detection unit 216 to detect one or more anomalies in the one or more anomaly frames from the one or more potential anomaly frames. For the sake of implementation, the surface in which the anomalies are to be detected is considered as a pipeline, such as a water pipeline in a water distribution system or a sewer pipe in a wastewater collection system. Examples of the types of anomalies that can be detected and classified by the anomaly detection server are cracks, sags, broken pipe, offset or open joints, protruding service connections, poor quality, missing lining, rust, cleaning needed, fracture, hole, deformed, collapse, surface damage, lining issues, weld failure, point repair, brickwork, Deposit Attached Grease (DADS) anomaly, roots anomalies (e.g., root fine joint (RFJ, root medium joint (RMJ), root fine connection (RFC) and root medium connection (RMC)). The anomaly detection unit 216 may detect anomalies from a pipe made from any material, for example, vitrified clay, concrete and the like. The anomaly detection unit 216 may detect anomalies in a surface, such as a pipe above-water or a pipe under water. The anomaly detection unit 216 may also ensure to mark a crack or other anomaly only once, thereby simplifying and streamlining the user review process.

After the one or more anomaly frames are detected, the anomaly classification unit 218 may be configured to classify the detected one or more anomalies in the one or more anomaly frames into at least one of a plurality of anomaly classes using the one or more deep learning techniques. Both the anomaly detection unit 216 and the anomaly classification unit 218 in conjunction form the deep learning model. After the one or more anomalies in the one or more anomaly frames are detected and classified, the anomaly detection unit 216 may be further configured to add at least one bounding box in one or more portions of the detected one or more anomaly frames. In an embodiment, the overlapping bounding boxes with same anomaly class are merged together. In an embodiment, a plurality of bounding boxes are added when the detected one or more anomaly frames comprises anomalies belonging to a plurality of anomaly classes. In an embodiment, the anomaly detection unit 216 may be further configured to add metadata comprising at least one of anomaly details, confidence score, anomaly label and distance information to the one or more anomaly frames. For example, if anomalies, such as cracks are being detected, the anomaly will be classified by the type of crack (e.g., longitudinal, circumferential, multiple, spiral, hinge). Further, a grade may be assigned based on the severity of the detected anomaly. For example, a grade of 1-5 may be assigned based on the NASSCO PACP standard (1-minor; 2-minor to moderate; 3-moderate; 4-significant; 5-most significant) or similar standard such as WRc MSCC5. In an embodiment, the health report may comprise one or more codes that correspond to one of: Manual of Sewer Condition Classification 5 (MSCC5) codes or any non-standard proprietary codes.

After the anomaly frames are detected and classified, the processor 202 may be configured to store the detected one or more anomalies in the one or more anomaly frames along with the associated classification in a database. In an embodiment, the database is used for subsequent training of the one or more trained models at a scheduled timing. In an embodiment, the database may be stored in the database server 102 as well.

Further, the report generation unit 220 may be configured to generate a health report comprising one or more anomalies in the one or more anomaly frames associated with the one or more surfaces and providing the health report to a user. For the purpose of the implementation of this invention, the surface corresponds to a water/wastewater pipeline and the health report further comprises one or more codes that correspond to Pipeline Assessment Certification Program (PACP) standard defect codes and the Manual of Sewer Condition Classification 5 (MSCC5) standard codes. The generated health report may be utilized by the user to prioritize and schedule repair activities associated with surface. In an embodiment, the health report may be generated in a pdf file format similar to PACP, MSCC5 or any other custom standard format. The generated report will have a summary page, which highlights the details of the assessment such as date, starting manhole and ending manhole, surface/pipe type, quick ratings, and surface/pipe index values and over all surface/pipe rating. In an embodiment, the health report may have a table of detected anomalies and the associated time stamp of the video or distance from the start manhole. The health report may further contain each detected anomaly snapshot image and details like code, description, timestamp of the video, distance and clock positions.

After the health report is generated, the generated health report may be transmitted to the user-computing device 106 to be viewed by the user. Once the user views the health report, the transceiver 206 may be configured to receive feedback from the user of the user-computing device 106. In an embodiment, the feedback comprises at least one of a false detection, a missed detection or a wrong classification. For example, the user can flag an anomaly which was identified as an anomaly by the system but it is not an anomaly in actuality. Further, the user can point out and locate some anomalies that were missed by the anomaly detection unit 216. Further, the user can also provide inputs regarding a potential mistake in the classification of the identified anomalies.

Further, the received user feedback is stored in the database for subsequent trainings. After the report has been generated and the feedback has been accumulated in the database over a period, the report generation unit 220 may be configured to dynamically retrain the one or more trained models based on the received feedback to adapt the one or more trained models for detection of anomalies in the one or more surfaces with at least one of: one or more new surface material type or different/changing surface conditions/patterns due to aging of the one or more surfaces over a period of time.

In an embodiment, the database server 102 maintains the model re-training scheduling information. At the scheduled time, the pre-processing unit 212 initiates the model re-training along with the respective datasets. The model re-training is also done based on the detected anomalies and the user feedback received from the previous health reports. In an embodiment, the pre-processing unit 212 may have information about the current surface material type and model that is selected for the current session. On receipt of the incremental training trigger from pre-processing unit 212, the pre-processing unit 212 then schedules incremental training for that particular model along with relevant accumulated training dataset details. The pre-processing unit 212 stores the model re-training scheduling information in model retraining configuration of the database on the database server 102 for the selected surface material type. The pre-processing unit 212 initiates the training by calling the initial method at the scheduled time and initial configuration method checks for the scheduled model re-training configurations and initiates the training. At the scheduled time, if the inspection session is active then the pre-processing unit 212 will wait until that session completes and then initiates the re-training.

Figure 3:
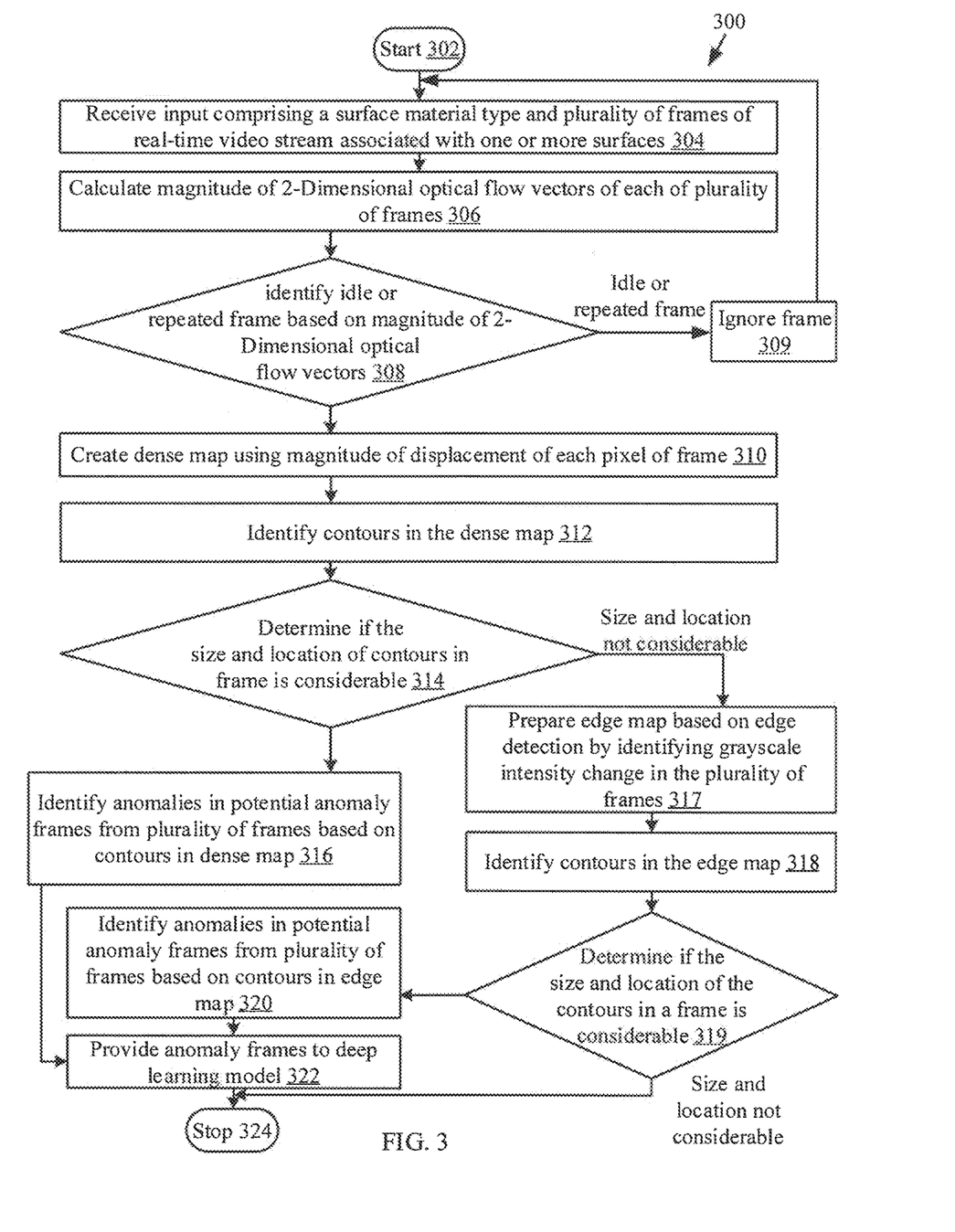
FIG. 3 is a flowchart illustrating a method for potential anomaly frame detection, in accordance with some embodiments of the present disclosure.

FIG. 3 is a flowchart illustrating a method 300 for potential anomaly frame detection, in accordance with some embodiments of the present disclosure. The method starts at step 302 and proceeds to step 304.

At step 304, the anomaly detection server 104 may receive an input comprising a surface material type and a plurality of frames of a real-time video stream associated with the one or more surfaces. At step 306, the anomaly detection server 104 may calculate a magnitude of 2-Dimensional optical flow vectors of each of the plurality of frames. At step 308, the anomaly detection server 104 may identify an idle or repeated frame based on the magnitude of 2-Dimensional optical flow vectors. If the frame is identified as an idle or repeated frame then at step 309, the idle or repeated frame is ignored and then method proceeds to receive next frame at step 304. If the frame is not identified as an idle or repeated frame then method proceeds to step 310. At step 310, the anomaly detection server 104 may create a dense map using a magnitude of displacement of each pixel of a frame from the plurality of frames. At step 312, the anomaly detection server 104 may identify contours in the dense map.

At step 314, the anomaly detection server 104 may determine if the size and location of the contours in a frame is considerable then the method proceeds to step 316. If the size and location of the contours in a frame is not considerable then the method proceeds to step 317. At step 316, the anomaly detection server 104 may identify one or more potential anomaly frames from the plurality of frames based on contours in a dense map created using a magnitude of displacement of each pixel of a frame from the plurality of frames. At step 317, the anomaly detection server 104 may prepare an edge map based on edge detection by identifying grayscale intensity change in the plurality of frames. At step 318, the anomaly detection server 104 may identify contours in the edge map. At step 319, the anomaly detection server 104 may determine if the size and location of the contours in a frame is considerable then method proceeds to step 320. If the size and location of the contours in a frame is not considerable then method proceeds to step 322. At step 322, the frame is ignored and not considered for further processing and then method proceeds to receive next frame at step 304.

At step 320, the anomaly detection server 104 may identify one or more potential anomaly frames from the plurality of frames based on contours in the edge map. The one or more potential anomaly frames identified from the plurality of frames at step 320 and step 316 are provided as input to the deep learning model 222 at step 322. Control passes to end step 324.

Figure 4:
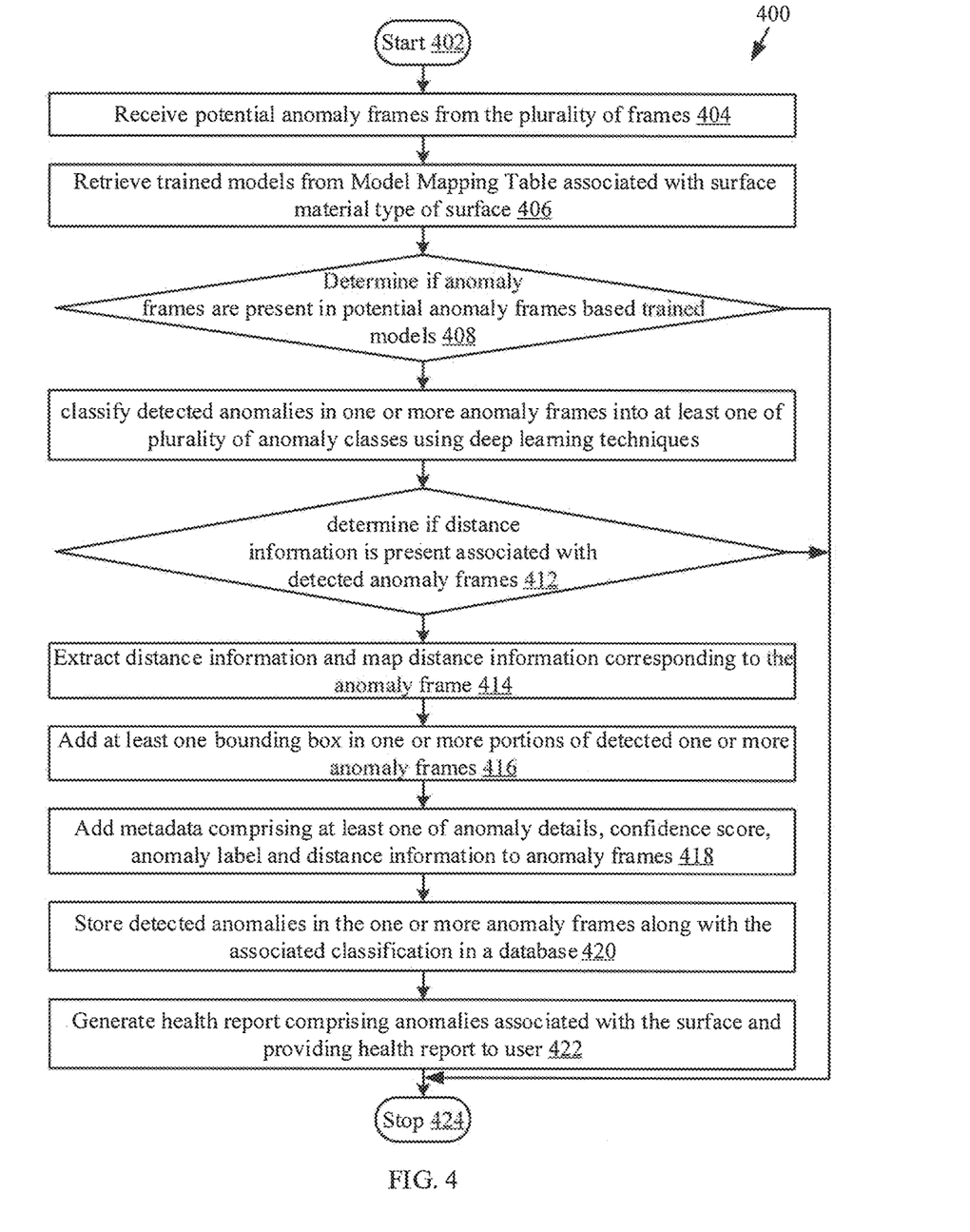
FIG. 4 is a flowchart illustrating a method for anomaly detection and classification using a deep learning model, in accordance with some embodiments of the present disclosure.

FIG. 4 is a flowchart illustrating a method 400 for anomaly detection and classification using a deep learning model, in accordance with some embodiments of the present disclosure. The method starts at step 402 and proceeds to step 404.

At step 404, the anomaly detection server 104 may receive one or more potential anomaly frames from the plurality of frames. At step 406, the anomaly detection server 104 may retrieve one or more trained models selected from a Model Mapping Table associated with a surface material type of the surface. At step 408, the anomaly detection server 104 may determine if one or more anomaly frames are present in the one or more potential anomaly frames based on one or more trained models. If one or more potential anomaly frames are present then method proceeds to step 410 else method proceeds to step 424. At step 410, the anomaly detection server 104 may classify the detected one or more anomalies in the one or more anomaly frames into at least one of a plurality of anomaly classes using the one or more deep learning techniques.

At step 412, the anomaly detection server 104 may determine if distance information is present associated with the detected one or more anomaly frames. If distance information is present then method proceeds to step 414, else method proceeds to step 424. At step 414, the anomaly detection server 104 may extract distance information and map the distance information corresponding to the anomaly frame. At step 416, the anomaly detection server 104 may add at least one bounding box in one or more portions of the detected one or more anomaly frames.

At step 418, the anomaly detection server 104 may add metadata comprising at least one of anomaly details, confidence score, anomaly label and distance information to the one or more anomaly frames. At step 420, the anomaly detection server 104 may store the detected one or more anomalies in the one or more anomaly frames along with the associated classification in a database. At step 422, the anomaly detection server 104 may generate a health report comprising one or more anomalies in the one or more anomaly frames associated with the one or more surfaces and providing the health report to a user. Control passes to end step 424.

Computer System

Figure 5:
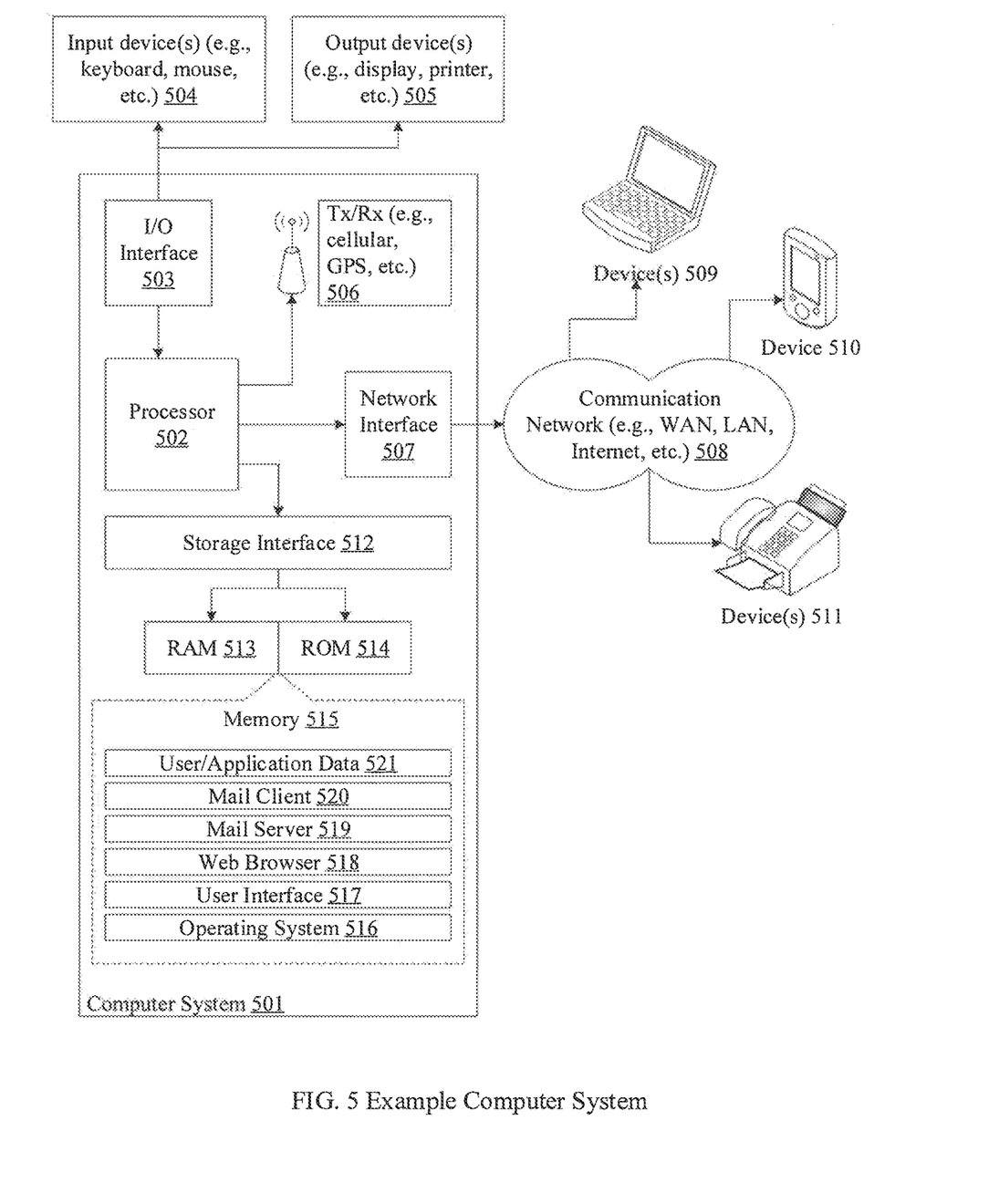
FIG. 5 illustrates a block diagram of an exemplary computer system for implementing embodiments consistent with the present disclosure.

FIG. 5 illustrates a block diagram of an exemplary computer system for implementing embodiments consistent with the present disclosure. Variations of computer system 501 may be used for generating a plurality of structured relations between a plurality of rewords. The computer system 501 may comprise a central processing unit ("CPU" or "processor") 502, Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD ATHLON, DURON OR OPTERON, ARM'S application, embedded or secure processors, IBM POWERPC, INTEL'S CORE, ITANIUM, XEON, CELERON or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WIMAX, or the like), etc.

Using the I/O interface 503, the computer system 401 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS WILINK WL1283, BROADCOM BCM4750IUB8, INFINEON TECHNOLOGIES X-GOLD 618-PMB9800, or the like), providing IEEE 802.11a/b/g/n, BLUETOOTH, FM, GLOBAL POSITIONING SYSTEM (GPS), 2G/3G HSDPA/HSUPA COMMUNICATIONS, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 501 may itself embody one or more of these devices.

In some embodiments, the processor 502 may be disposed in communication with one or more memory devices 515 (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE MACINTOSH OS X, UNIX, UNIX-like system distributions (e.g., Berkeley Software Distribution (BSD), FreeBSD, NetBSD, OpenBSD, etc.), Linux distributions (e.g., RED HAT, UBUNTU, KUBUNTU, etc.), IBM OS/2, MICROSOFT WINDOWS (XP, VISTA/7/8, ETC.), APPLE IOS, GOOGLE ANDROID, BLACKBERRY OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' AQUA, IBM OS/2, MICROSOFT WINDOWS (e.g., Aero, Metro, etc.), UNIX X-WINDOWS, web interface libraries (e.g., ACTIVEX, JAVA, JAVASCRIPT, MAX, HTML, ADOBE FLASH, etc.), or the like.

In some embodiments, the computer system 501 may implement a web browser 518 stored program component. The web browser 518 may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE FLASH, JAVASCRIPT, JAVA, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ACTIVEX, ANSI C++/C#, MICROSOFT .NET, CGI SCRIPTS, JAVA, JAVASCRIPT, PERL, PHP, PYTHON, WEBOBJECTS, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as APPLE MAIL, MICROSOFT ENTOURAGE, MICROSOFT OUTLOOK, MOZILLA THUNDERBIRD, etc.

In some embodiments, computer system 501 may store user/application data 521, such as the data, variables, records, etc. as described in this disclosure. Such databases may be implemented as fault-tolerant, relational, scalable, secure databases such as ORACLE, MS-SQL OR SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

Advantages

The proposed approach provides a complete solution to detect and classify the anomalies of any surface/pipe material type directly from a real-time video stream or recorded video file. The disclosed method and system gives a fast and accurate detection solution suitable for the real time video stream and recorded video file. The disclosed method and system eliminates the unwanted frames from the video and identities the minimal and sufficient number of relevant video frames to make the solution faster and suitable for real time video stream input. The disclosed method and system also provide capabilities to make the solution more accurate irrespective of aging of the surface, such as pipes and addition of new surface/pipe material type. The disclosed method and system may have multiple different models specific to scan/investigation and surface/pipe type. The disclosed method and system may accumulate the expert user feedback and adapt the model with the different surface conditions due to aging of the pipe by selective re-training of models based on the cumulative feedback dataset. This gives the accurate results by inferencing only the relevant and sufficient number of frames from the video.

Thus, the disclosed method and system tries to overcome to technical problem of detecting and classifying anomalies in surfaces, such as pipelines by using trained models. Specifically, the method and system adapts/retrains the existing trained models with the different surface conditions due to aging of the pipe by selective re-training of models based on the cumulative feedback dataset. Conventional anomaly detection systems cannot detect anomalies for different surface conditions due to aging of the pipe. Further, in the conventional anomaly detection systems only a single trained model is used for detection of anomalies. In contrast, in the disclosed method and system there are multiple trained models stored in the Model Mapping Table that are associated with each surface material type. In addition, in the conventional anomaly detection systems, all the frames in the video are used to detect the anomalies. In contrast, in the disclosed method and system only the potential anomaly frames are provided as input to the deep learning model. This gives the accurate results by inferencing only the relevant and sufficient number of frames from the video and thereby improving the timing of detection of the anomalies.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for detection of anomalies in one or more surfaces, the method comprising:
   receiving, by an anomaly detection server, an input comprising a surface material type and a plurality of frames of a real-time video stream associated with the one or more surfaces;
   eliminating, by the anomaly detection server, one or more unwanted frames from the plurality of frames based on a magnitude of 2-Dimensional optical flow vectors of each of the plurality of frames;
   identifying, by the anomaly detection server, one or more potential anomaly frames from the plurality of frames based on contours in a dense map created using a magnitude of displacement of each pixel of a frame from the plurality of frames, wherein the magnitude of displacement of the pixel is determined based on the optical flow vectors associated with each frame, wherein based on the size and location of the contours in a frame, the frame is identified as a potential anomaly frame;
   detecting, by the anomaly detection server, in real-time one or more anomalies in one or more anomaly frames from the one or more potential anomaly frames based on one or more trained models selected from a Model Mapping Table, wherein each of the one or more trained models is associated with one or more surface material types of the one or more surfaces, wherein each of the one or more trained models are trained using one or more deep learning techniques;
   classifying, by the anomaly detection server, the detected one or more anomalies in the one or more anomaly frames into at least one of a plurality of anomaly classes using the one or more deep learning techniques; and generating, by the anomaly detection server, a health report comprising one or more anomalies in the one or more anomaly frames associated with the one or more surfaces and providing the health report to a user.

2. The method of claim 1, further comprising receiving feedback from the user, wherein the feedback comprises at least one of: a false detection, a missed detection or a wrong classification; and dynamically retraining the one or more trained models based on the received feedback to adapt the one or more trained models for detection of anomalies in the one or more surfaces with at least one of: one or more new surface material type or different/changing surface conditions/patterns due to aging of the one or more surfaces over a period of time.

3. The method of claim 1, wherein detection in real-time of the one or more anomaly frames comprises:

adding at least one bounding box in one or more portions of the detected one or more anomaly frames, wherein overlapping bounding boxes with same anomaly class are merged together, and wherein plurality of bounding boxes are added when the detected one or more anomaly frames comprises anomalies belonging to plurality of anomaly classes; and adding metadata comprising at least one of anomaly details, confidence score, anomaly label and distance information to the one or more anomaly frames.

4. The method of claim 1, wherein the Model Mapping Table comprises one or more versions of each of the trained models associated with each of the one or more surface material types, and information related to history of accuracy for each of the one or more versions of each of the trained models.

5. The method of claim 1, wherein if a trained model is not present in the Model Mapping Table for one or more new surface material types then creating a placeholder for a training dataset and adding configuration details of a base model for the one or more new surface material types in the Model Mapping Table.

6. The method of claim 1, wherein identifying one or more potential anomaly frames from the plurality of frames further comprises:

preparing an edge map based on edge detection by identifying grayscale intensity change in the plurality of frames, wherein the intensity change regions are identified by finding a gradient of the plurality of frames.

7. The method of claim 1, wherein the one or more trained models have been trained to detect non-defect items comprising cobwebs, water surfaces, wall surface patterns, water flow marks on the surfaces and further eliminate the non-defect items from the health report.

8. The method of claim 1, further comprising storing the detected one or more anomalies in the one or more anomaly frames along with the associated classification and the user feedback in a database, wherein the database is used for subsequent training of the one or more trained models at a scheduled timing.

9. The method of claim 1, wherein the one or more surfaces comprises a conduit, a plain surface, or an irregular shaped surface.

10. The method of claim 1, wherein the health report further comprises one or more codes that correspond to one of: Pipeline Assessment Certification Program (PACP) standard defect codes, Manual of Sewer Condition Classification 5 (MSCC5) codes or any non-standard proprietary codes.

11. An anomaly detection server to detect anomalies in one or more surfaces, the anomaly detection server comprising:

a processor; and a memory communicatively coupled to the processor, wherein the memory stores processor instructions which, on execution, causes the processor to:

receive an input comprising a surface material type and a plurality of frames of a real-time video stream associated with the one or more surfaces;

eliminate one or more unwanted frames from the plurality of frames based on a magnitude of 2-Dimensional optical flow vectors of each of the plurality of frames;

identify one or more potential anomaly frames from the plurality of frames based on contours in a dense map created using a magnitude of displacement of each pixel of a frame from the plurality of frames, wherein the magnitude of displacement of the pixel is determined based on the optical flow vectors associated with each frame, wherein based on the size and location of the contours in a frame, the frame is identified as a potential anomaly frame;

detect in real-time one or more anomalies in one or more anomaly frames from the one or more potential anomaly frames based on one or more trained models selected from a Model Mapping Table, wherein each of the one or more trained models is associated with one or more surface material types of the one or more surfaces, wherein each of the one or more trained models are trained using one or more deep learning techniques;

classify the detected one or more anomalies in the one or more anomaly frames into at least one of a plurality of anomaly classes using the one or more deep learning techniques; and generate a health report comprising the one or more anomalies in the one or more anomaly frames associated with the one or more surfaces and providing the health report to a user.

12. The anomaly detection server of claim 11, wherein the processor is configured to receive feedback from the user, wherein the feedback comprises at least one of: a false detection, a missed detection or a wrong classification; and dynamically retraining the one or more trained models based on the received feedback to adapt the one or more trained models for detection of anomalies in the one or more surfaces with at least one of one or more new surface material type or different/changing surface conditions/patterns due to aging of the one or more surfaces over a period of time, and wherein the one or more surfaces comprises a conduit, a plain surface, or an irregular shaped surface.

13. The anomaly detection server of claim 11, wherein detection in real-time of the one or more anomaly frames comprises:

adding at least one bounding box in one or more portions of the detected one or more anomaly frames, wherein overlapping bounding boxes with same anomaly class are merged together, and wherein plurality of bounding boxes are added when the detected one or more anomaly frames comprises anomalies belonging to plurality of anomaly classes; and adding metadata comprising at least one of anomaly details, confidence score, anomaly label and distance information to the one or more anomaly frames.

14. The anomaly detection server of claim 11, wherein the Model Mapping Table comprises one or more versions of each of the trained models associated with each of the one or more surface material types, and information related to history of accuracy for each of the one or more versions of each of the trained models.

15. The anomaly detection server of claim 11, wherein if a trained model is not present in the Model Mapping Table for one or more new surface material types then creating a placeholder for a training dataset and adding configuration details of a base model for the one or more new surface material types in the Model Mapping Table.

16. The anomaly detection server of claim 11, wherein identifying one or more potential anomaly frames from the plurality of frames further comprises:
   preparing an edge map based on edge detection by identifying grayscale intensity change in the plurality of frames, wherein the intensity change regions are identified by finding a gradient of the plurality of frames.

17. The anomaly detection server of claim 11, wherein the one or more trained models have been trained to detect non-defect items comprising cobwebs, water surface's, wall surface patterns, water flow marks on the surfaces and further eliminate the non-defect items from the health report.

18. The anomaly detection server of claim 11, wherein the processor is further configured to storing the detected one or more anomalies in the one or more anomaly frames along with the associated classification and the user feedback in a database, wherein the database is used for subsequent training of the one or more trained models at a scheduled timing.

19. The anomaly detection server of claim 11, wherein the health report further comprises one or more codes that correspond to one of: Pipeline Assessment Certification Program (PACP) standard defect codes; Manual of Sewer Condition Classification 5 (MSCC5) codes or any non-standard proprietary codes.

20. A non-transitory computer-readable storage medium having stored thereon, a set of computer-executable instructions for causing a computer comprising one or more processors to perform steps comprising:
   receiving an input comprising a surface material type and a plurality of frames of a real-time video stream associated with the one or more surfaces;
   eliminating one or more unwanted frames from the plurality of frames based on a magnitude of 2-Dimensional optical flow vectors of each of the plurality of frames;
   identifying one or more potential anomaly frames from the plurality of frames based on contours in a dense map created using a magnitude of displacement of each pixel of a frame from the plurality of frames, wherein the magnitude of displacement of the pixel is determined based on the optical flow vectors associated with each frame, wherein based on the size and location of the contours in a frame, the frame is identified as a potential anomaly frame;
   detecting in real-time one or more anomalies in one or more anomaly frames from the one or more potential anomaly frames based on one or more trained models selected from a Model Mapping Table, wherein each of the one or more trained models is associated with one or more surface material types of the one or more surfaces, wherein each of the one or more trained models are trained using one or more deep learning techniques;
   classifying the detected one or more anomalies in the one or more anomaly frames into at least one of a plurality of anomaly classes using the one or more deep learning techniques; and
   generating a health report comprising the one or more anomalies in the one or more anomaly frames associated with the one or more surfaces and providing the health report to a user.

\* \* \* \* \*